G. HERBERT, Jr.
APPARATUS FOR DISTRIBUTING SUGAR OVER BISCUITS, CAKES, AND SUCH LIKE.
APPLICATION FILED MAY 29, 1908.
907,351.
Patented Dec. 22, 1908.
3 SHEETS—SHEET 1.
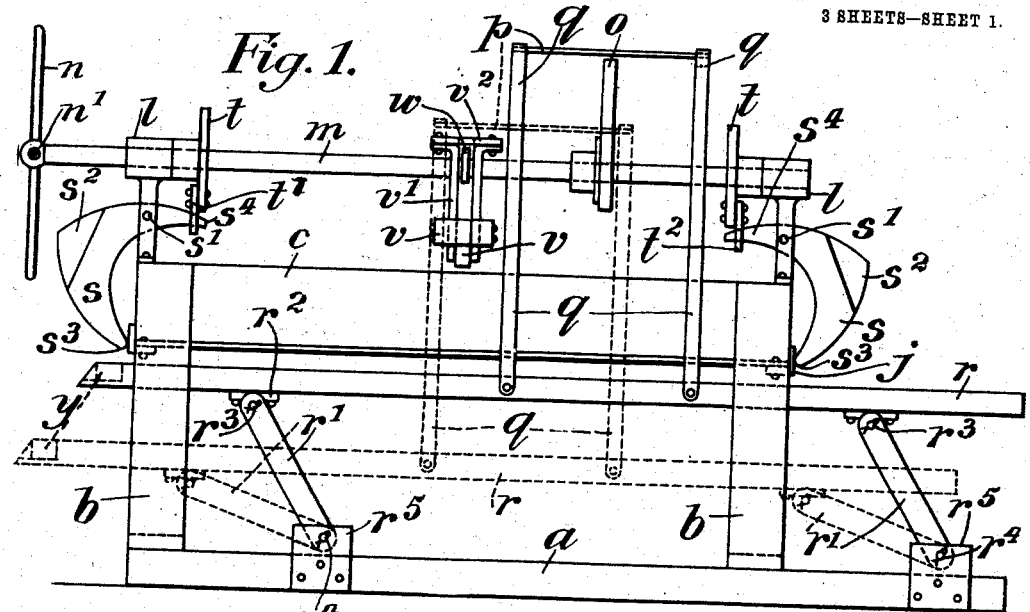
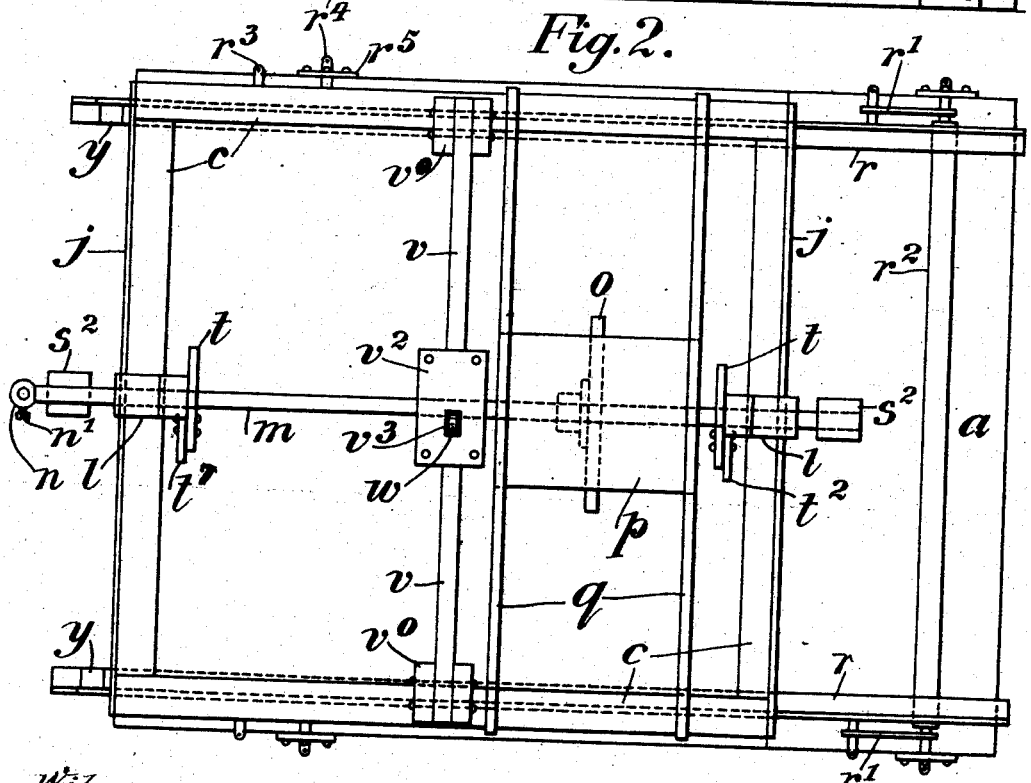
Witnesses:
L. Douville
H. G. Dieterich
Inventor:
George Herbert, Jr.
By Wiedersheim & Fairbanks
Attorneys.

G. HERBERT, Jr.
APPARATUS FOR DISTRIBUTING SUGAR OVER BISCUITS, CAKES, AND SUCH LIKE.
APPLICATION FILED MAY 29, 1908.
907,351.
Patented Dec. 22, 1908.
3 SHEETS—SHEET 2.
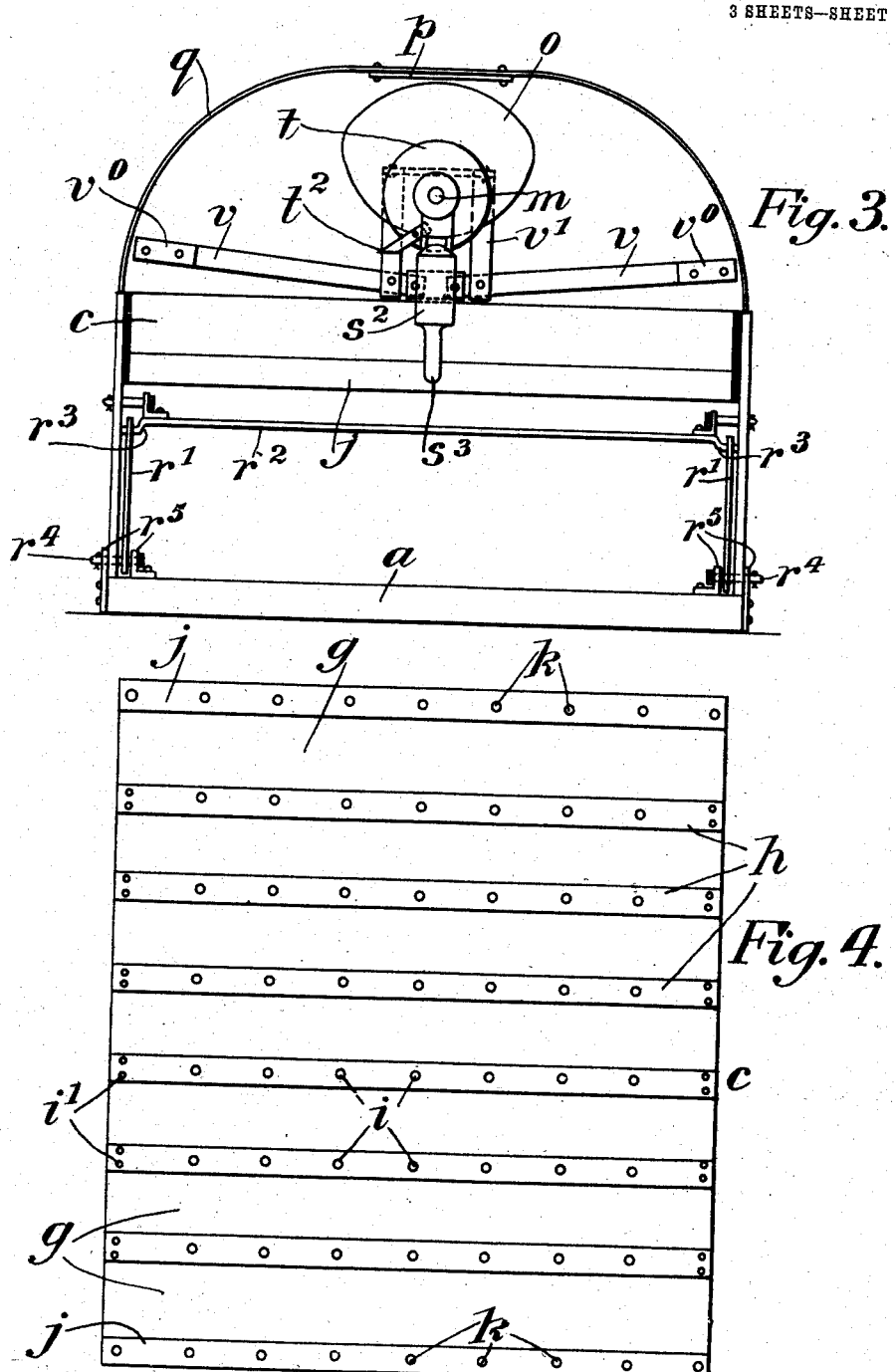

G. HERBERT, Jr.
APPARATUS FOR DISTRIBUTING SUGAR OVER BISCUITS, CAKES, AND SUCH LIKE.
APPLICATION FILED MAY 29, 1908.
907,351.
Patented Dec. 22, 1908.
3 SHEETS—SHEET 3.
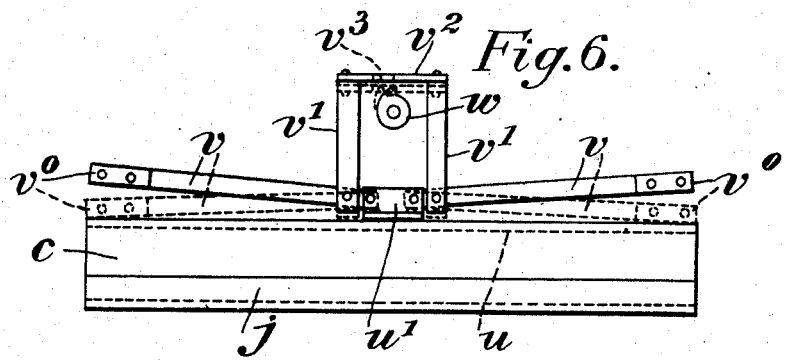
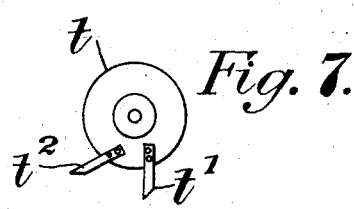
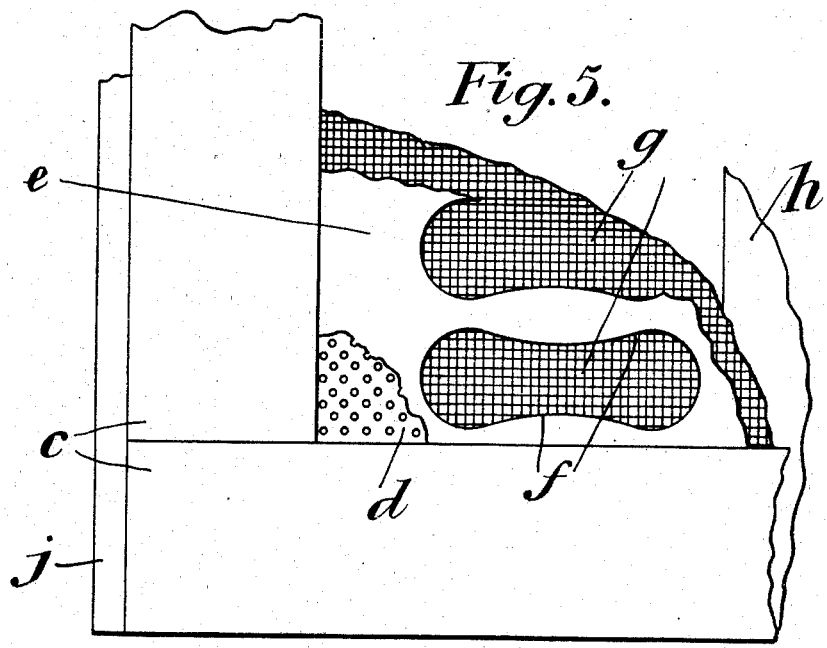

UNITED STATES PATENT OFFICE.

GEORGE HERBERT, JR., OF GLASGOW, SCOTLAND.

APPARATUS FOR DISTRIBUTING SUGAR OVER BISCUITS, CAKES, AND SUCH LIKE.

No. 907,351.      Specification of Letters Patent.      Patented Dec. 22, 1908.

Application filed May 29, 1908. Serial No. 435,792.

*To all whom it may concern:*

Be it known that I, GEORGE HERBERT, Jr., of 719 Shields road, Pollokshields, Glasgow, Scotland, a subject of the King of Great Britain, have invented a certain new and useful Improved Apparatus for Distributing Sugar Over Biscuits, Cakes, and Such Like, of which the following is a specification.

This invention relates to an apparatus for accurately and uniformly distributing a thin coating of sugar over the surface of biscuits, cakes, or such like.

Heretofore, in distributing sugar over biscuits, it has been usual to shake or dump a tray or sieve having a wire gauze or like bottom upon which the sugar is placed, over the biscuits with the result that the sugar is distributed more or less unequally upon the biscuits, and spreads more or less upon the pans themselves forming a deposit of sugar between the biscuits, which, during the firing, is burned and has to be subsequently scraped off.

Under my invention the sugaring is performed by percussive action the sugar being placed in a perforated holder or upon a perforated plate which is fixedly held in position and blows are given to it so as to set up tremors or vibrations in the sugar with the result that the latter is uniformly and accurately deposited through the perforations, like rain, upon the biscuits. Preferably, the sugar is placed upon a perforated sheet or plate to which sharp taps or blows are delivered by suitable mechanism so as to give a tremulous movement to the sugar with the result that the particles of sugar which have previously lodged themselves in the perforations will be delivered from the plate or sheet, a uniform quantity falling from each perforation, and in order to break up the small quantities of sugar falling from each perforation and thereby distribute the same in a uniform and finely divided layer, I, preferably, provide beneath the perforated plate or sheet, a sheet of fine wire gauze. I also, under my invention, provide means for preventing the fall of sugar between the biscuits, and this means consists, preferably, of one or more die plates or sheets having a series of holes or dies corresponding in size, form, and position, to the biscuits or the like to,be covered. When only one such die plate or sheet is used it may be arranged between the perforated plate and the sheet of fine wire gauze, and the second, when two are used, may be arranged beneath the wire gauze.

In order that my invention may be clearly understood I have hereunto appended explanatory drawings which show, by way of illustration or example, one method of carrying out the said invention.

On the said drawings:—Figure 1 is a side view of the sugaring apparatus or machine. Fig. 2 is a plan of the same. Fig. 3 is an end view of the same. Fig. 4 is an inverted plan of the box or tray $c$. Fig. 5 is a plan view showing, to an enlarged scale, one corner of the box or tray the plates or sheets being broken away so as to show their relative positions, and the wire gauze $g$ for clearness in drawing being shown enlarged somewhat out of proportion. Fig. 6 is an end view of the box or tray $c$ and showing the side striking mechanism. Fig. 7 is a view of the wiper wheel $t$ for the end striking mechanism.

Referring to the drawings:—The machine is made with a base $a$ from which four bars or supports $b$ extend upwards and carry, at their upper ends, a metal frame or the like $c$ upon whose lower face the plates or sheets for the delivery of the sugar are secured in such manner that the frame $c$ serves as a box or tray for the reception of the sugar to be distributed over the surface of the biscuit. Against the lower face of the frame is placed a perforated metal plate $d$ of, preferably, from one thirty second to one eighth part of an inch in thickness, and beneath this plate is placed a second metal plate $e$ which is made with, say, seven rows of holes or dies $f$ similar in size and shape to the biscuits being sugared. (On the drawing the shape corresponds to those biscuits known as "sponge fingers"). Beneath this second plate is placed a sheet $g$ of fine wire gauze, the two plates and this gauze being bound securely together and to the frame $c$ by means of six metal straps $h$ and bolts $i$ which are passed therethrough and through the said plates and gauze. The straps $h$ are arranged to lie between the rows of holes or openings $f$ so as not to interfere with the passage of the sugar. The two plates and the gauze are secured to the under side of the side bars of the frame $c$ by means of set pins $i^1$ passed therethrough and through the ends of the straps $h$, and to the end rails of the frame by means of two bars $j$ of angular cross section, the horizontal flanges of these bars having set pins $k$ passed therethrough and through the plates and gauze into the frame, and the vertical flanges lie against the ends of the frame.

Mounted on the end rails of the frame $c$ are two bearing brackets $l$ which carry a longitudinal spindle $m$ one of whose ends is extended outwards clear of the machine and is provided with an operating handle $n$ secured thereon by means of a pinching screw $n^1$, and keyed on the spindle $m$ is a cam $o$ above which is arranged a plate $p$ having a pair of outward and downwardly extending straps $q$ the lower ends of which are secured beneath the box or tray to a pair of bars or rails $r$ of angular cross section which are arranged between the bars or supports $b$ and are adapted to move upwards and downwards with a parallel movement by the action on the plate $p$ of the cam $o$ which is operated on the spindle $m$ being turned by means of the handle $n$. The rails $r$ are guided in their parallel movement by means of links $r^1$ by means of which they are connected to the base $a$ of the machine, the rails being connected together by means of a pair of cross straps $r^2$ which are suitably secured to the horizontal flanges of the rails and are provided, on their ends, with pintles $r^3$ for engagement with holes in the upper ends of the links whose lower ends are connected with the base $a$ by means of pins $r^4$ passed therethrough and carried between brackets $r^5$ secured on the base $a$. The rails $r$ are adapted, when in their lower position which is indicated by dotted lines at Fig. 1, to receive upon their horizontal and between their vertical flanges the pan upon which the "sponge finger" biscuits over which the sugar is to be distributed have been previously arranged, mechanically or otherwise, in positions corresponding to the positions of the holes or openings $f$, aforesaid, and when the rails $r$ have been raised upwards by the action of the cam $o$ into the position indicated in full lines at Fig. 1, the biscuits are in position for sugaring and lie each immediately below one of the holes or openings $f$.

Mounted in each of the brackets $l$ on the frame $c$ is a pivoted striker or hammer $s$ which is carried on a pin $s^1$ so as to work in a slot or recess in the bracket. This striker $s$ is weighted at $s^2$ and its lower end $s^3$ rests normally against the bar $j$ at the end of the frame $c$, while the upper end $s^4$ of the striker extends inwards above the frame $c$ and below a wiper wheel $t$ which is mounted on the spindle $m$ and is provided with a pair of wiper arms $t^1$, $t^2$, which, in turn, act on the end $s^4$ of the striker first depressing same and thereby raising the lower or striking end $s^3$, and then releasing it and thereby allowing the striking end to fall and strike a sharp blow on the bar $j$ of the frame thereby causing the vibrations which, being transmitted to the perforated plate, produce the discharge of sugar on to the biscuits. The two wiper wheels $t$ have their wiper arms $t^1$, $t^2$, so arranged that the strikers $s$ are operated simultaneously.

Another striking device is provided for acting on the side rails of the frame $c$. A central supporting bar $u$ is fitted across the center of the frame $c$ being secured at its ends in recesses provided therefor in the side rails of the frame, and secured on the cross bar $u$, at the center thereof, are a pair of brackets $u^1$ between which are pivoted the inner ends of a pair of striking arms $v$ whose outer ends are weighted at $v^0$ and are adapted to strike the upper face of the side rails of the frame $c$. Pin jointed to each arm $v$, near its pivoted end, are a pair of straps $v^1$ which are secured, at their upper ends, to a plate $v^2$ which connects the two pairs of straps $v^1$ and forms a bridge piece over the spindle $m$.

Mounted on the spindle $m$, beneath the plate $v^2$, is a cam $w$ which, on being turned by means of the spindle, raises the plate $v^2$ and with it the striking arms $v$ from the position shown in dotted lines to that shown in full lines at Fig. 6, and on the cam $w$ being further rotated the nose thereof will come into engagement with a hole or opening $v^3$ provided in the plate $v^2$ thereby allowing the striking arms $v$ to fall and deliver a sharp blow to the side rails of the frame $c$. The cam $w$ is so fitted on the spindle $m$ that the blow is delivered to the frame by the striking arms $v$ after the first and before the second striking of the end strikers $s$. The vibrations of the metal are transmitted to the perforated plate and the sugar deposit is obtained as before.

The operation of the machine is as follows:—The rails $r$ being in their lower position, indicated in dotted lines at Fig. 1, the pan with the biscuits arranged thereon is placed in position upon the rails and against the stop blocks $y$. Then, upon the spindle $m$ being turned by means of its handle $n$, the cam $o$ comes into action and raises the rails into the position indicated in full lines at Fig. 1, and, on further rotation of the spindle $m$, the wiper arms $t^1$ on the wiper wheels $t$ come into action and cause the strikers $s$ to deliver a sharp blow to each end of the sugar box or tray. The central cam $w$ next comes into action and causes the striking of the side arms $v$, and finally the second wiper arms $t^2$ come into play and cause the second striking of the end strikers $s$. Further rotation of the spindle $m$ so turns the cam $o$ as to lower the rails $r$ and permit of the removal of the pan with the sugared biscuits thereon. The cams and wiper arms are so arranged that one complete revolution of the spindle $m$ causes the biscuits to be raised into position for sugaring, the sugar to be delivered, and the sugared biscuits to be finally moved downwards so as to permit of their removal.

Instead of the biscuits being fed to the machine by hand as in the foregoing example they may be fed mechanically, or, if desired, may be sugared upon a traveling web stopped momentarily during each delivery of the sugar. In such cases the shaft $m$ may be rotated by power.

It is obvious that the tremors or vibrations transmitted to the perforated plate may be caused by other suitable and well known arrangements of mechanism, but the arrangement I have shown is found to work well in practice. It is also obvious that taps or blows might be given to the plate, when the biscuits are to be sugared, by means of a striker actuated in the same way as an ordinary electric bell.

Having now fully described my invention what I claim and desire to secure by Letters Patent is:—

1. A sugaring apparatus comprising perforated means for holding the sugar, means for imparting, by percussive action, tremors or vibrations to the said holding means, and means for preventing the sugar falling between the articles being sugared.

2. A sugaring apparatus comprising a sugar holder having a perforated bottom plate, means for imparting, by percussive action, tremors or vibrations to the said bottom plate, and means for preventing the sugar falling between the articles being sugared.

3. A sugaring apparatus comprising a sugar holder having a perforated bottom plate with a sheet of wire gauze thereunder, means for imparting, by percussive action, tremors or vibrations to the said bottom plate, and means for preventing the sugar falling between the articles being sugared.

4. A sugaring apparatus comprising a fixed and perforated sugar holder, a sheet of wire gauze thereunder, a die plate for preventing the sugar falling down between the articles being sugared, and means for imparting, by percussive action, tremors or vibrations to said bottom plate.

5. A sugaring apparatus comprising a sugar holder consisting of a metal frame having a perforated bottom plate, a die plate secured to said frame, means for holding the frame fixedly in position, and means for striking the frame at both ends and on the sides so as to impart tremors or vibrations to the sugar in said holder.

6. A sugaring apparatus comprising a sugar holder consisting of a frame having a perforated bottom plate, a die plate secured to said frame, and weighted strikers for striking the ends and sides of said frame so as to impart tremors or vibrations to the sugar in the holder.

7. A sugaring apparatus comprising a sugar holder consisting of a frame having a perforated bottom plate, a die plate secured to said frame, weighted strikers for striking the ends of said frame, weighted strikers for striking the sides of said frame, and cam and wiper means for raising the strikers and subsequently allowing them to fall and strike the frame so as to impart tremors or vibrations to the sugar in the holder.

8. A sugaring apparatus comprising a sugar holder consisting of a frame having a perforated bottom plate, a die plate secured to said frame, means for carrying the articles to be sugared, means for moving the said carrying means into position for sugaring, and means for striking the frame so as to impart tremors or vibrations to the sugar in said holder.

9. A sugaring apparatus comprising a sugar holder consisting of a frame having a perforated bottom plate, a die plate secured to said frame, a pan, a pair of parallel rails for carrying the pan, a spindle, a cam thereon, a plate above the said cam, straps connecting the plate with the said rails, means for operating the cam and raising the said pan, and means for striking the frame so as to impart tremors or vibrations to the sugar in said holder.

In testimony whereof I affix my signature in presence of two witnesses.

GEORGE HERBERT, Jr.

Witnesses:
FRED MIDDLETON,
ROBERT A. THOMSON.